United States Patent [19]
Miyamoto et al.

[11] Patent Number: 5,369,655
[45] Date of Patent: Nov. 29, 1994

[54] OUTPUT CONTROL METHOD FOR LASER SYSTEM

[75] Inventors: Yasuaki Miyamoto; Shigeaki Kawakami; Takayuki Taniguchi; Makoto Hasegawa, all of Ibaraki; Shigenori Fujiwara; Nobuteru Fujimura, both of Kawasaki, all of Japan

[73] Assignee: Doryokuro Kakunenryo Kaihatsu Jigyodan, Tokyo, Japan

[21] Appl. No.: 36,409

[22] Filed: Mar. 24, 1993

[30] Foreign Application Priority Data

Mar. 27, 1992 [JP] Japan ............... 4-070838

[51] Int. Cl.$^5$ .................................. H01S 3/13
[52] U.S. Cl. .................................. 372/29; 372/38
[58] Field of Search ........................... 372/29, 38

[56] References Cited

U.S. PATENT DOCUMENTS

| | | | |
|---|---|---|---|
| 4,504,951 | 3/1985 | McMahan et al. | 372/38 |
| 4,890,291 | 12/1989 | Yamazaki | 372/38 |
| 4,921,357 | 5/1990 | Karube et al. | 372/38 |

Primary Examiner—Georgia Y. Epps
Attorney, Agent, or Firm—Armstrong, Westerman, Hattori, McLeland & Naughton

[57] ABSTRACT

An output control method for a laser system comprised of a laser oscillator and a laser amplifier. The method enables the output energy to be stably controlled over a wide range, without changing the excitation energy, by controlling the delay ($\tau$) of the excitation energy application timing of the laser oscillator with respect to the excitation energy application timing of the laser amplifier.

4 Claims, 5 Drawing Sheets

OUTPUT CONTROL METHOD FOR LASER SYSTEM

BACKGROUND OF THE INVENTION

The present invention relates to an output control method for a laser system. More particularly, the present invention relates to an output control method for a laser system comprising a laser oscillator and a laser amplifier, which enables the output of the laser system to be stably controlled over a wide range.

The output of an MOPA (Master Oscillator-Power Amplifier) laser system, which comprises a laser oscillator and a multiplicity of laser amplifiers, has heretofore been controlled by a method in which the laser gain is varied by controlling the excitation energy for the laser medium of each of the oscillator and amplifiers. This conventional method suffers, however, from the problem that oscillation and amplification are unstable in a state where the excitation energy is small, and since the energy supplied to the medium changes, the thermal behavior of the medium becomes unstable. In addition, when the laser system employs as an excitation energy switching power supply a power supply constructed exclusively of solid-state components including a semiconductor device, e.g., a thyristor, and a magnetic pulse compressor circuit, the adjustable voltage range is so narrow that it is difficult to control the output energy delicately.

SUMMARY OF THE INVENTION

In view of the above-described circumstances, it is an object of the present invention to provide an output control method for a laser system comprising a laser oscillator and a laser amplifier, which enables the output energy to be stably controlled over a wide range without changing the excitation energy.

To attain the above-described object, the present invention provides an output control method for a laser system having a laser oscillator and a laser amplifier for amplifying light oscillated from the laser oscillator. The output laser light energy is controlled by controlling the delay of the excitation energy application timing of The laser oscillator with respect to the excitation energy application timing of the laser amplifier.

Preferably, the excitation energy applied to the laser amplifier and the excitation energy applied to the laser oscillator are each maintained at a constant level. By doing so, the respective media of the laser amplifier and the laser oscillator are thermally stabilized, and hence the output is stabilized.

If a power supply constructed exclusively of solid-state components is employed as a switching power supply for supplying excitation energy to each of the laser oscillator and laser amplifier, the desired output energy can be selected nicely.

As a specific example, the system may be constructed by using a TEA-$CO_2$ laser as each of the laser oscillator and laser amplifier.

In the present invention, the output laser light energy is controlled by controlling the delay of the excitation energy application timing of the laser oscillator with respect to the excitation energy application timing of the laser amplifier. Accordingly, the output of the system can be stably controlled over a wide range without changing the excitation energy.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

The principle of the laser system output control method according to the present invention will first be explained. An MOPA laser system comprises a laser oscillator and a laser amplifier that amplifies laser light oscillated from the laser oscillator. The laser output energy from this laser system can be controlled by controlling the delay of the excitation energy application timing of the oscillator with respect to the excitation energy application timing of the amplifier without changing the excitation energy supplied to the respective laser media of the oscillator and the amplifier. This control method makes use of the temporal change in the laser gain after the application of excitation energy to the laser medium of the amplifier.

That is, in general, when a laser medium is excited on application of excitation energy, population inversion is established in the medium. The laser gain is proportional to the intensity of the population inversion. Molecules or atoms excited to a high energy level relax with time, and the population inversion intensity also attenuates correspondingly. Accordingly, by utilizing the temporal change in the laser gain, the laser light amplification factor can be controlled, and hence in the MOPA laser system the output energy can be controlled.

Figure 1:
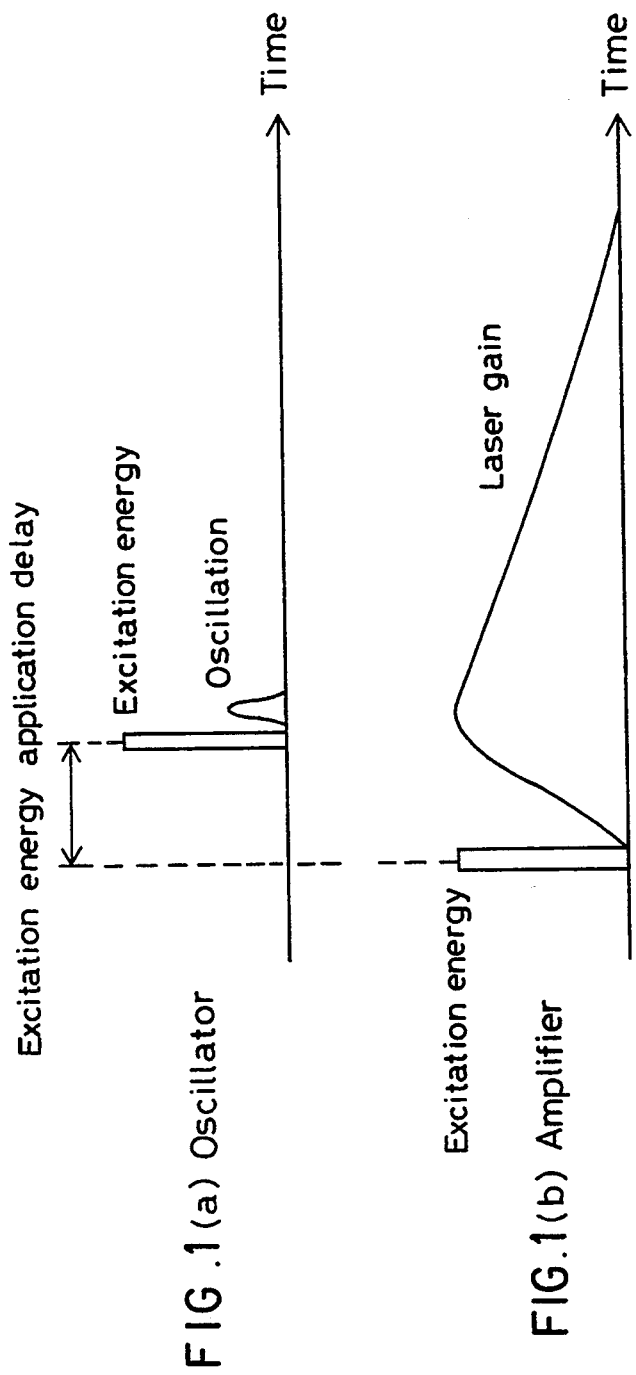
FIGS. 1(*a*, *b*) shows the excitation of a laser oscillator in a MOPA laser system and the change of the oscillation operation with time, and also shows the excitation of a laser amplifier in the MOPA laser system and the change of the laser gain with time.
Figure 2:
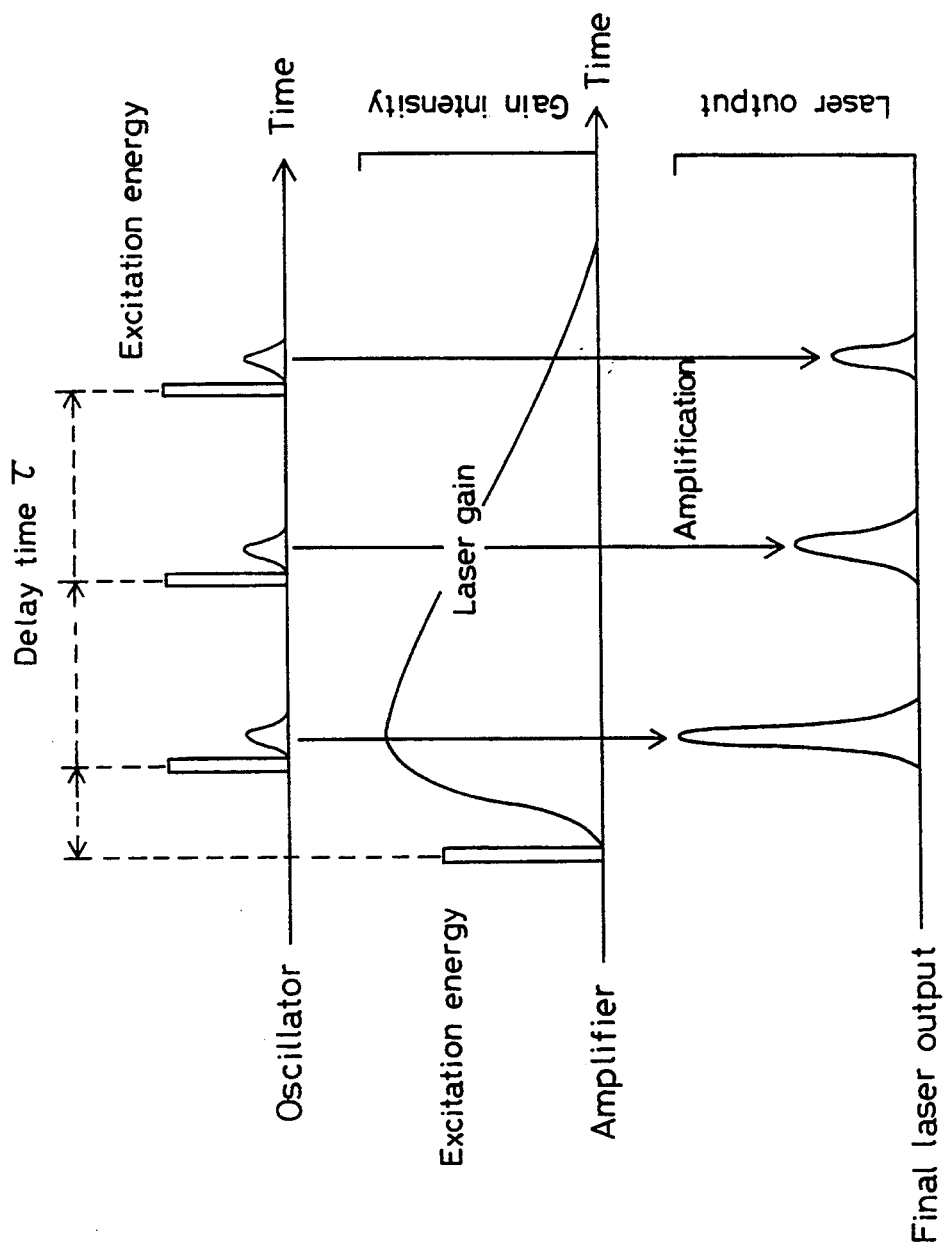
FIG. 2 shows the relationship between the excitation timing of the oscillator and that of the amplifier, and the final laser output.

FIG. 1(*a*) shows the excitation of a laser oscillator in the MOPA laser system and the change of the oscillation operation with time, and FIG. 1(*b*) shows the excitation of a laser amplifier in the MOPA laser system and the change of the laser gain with time. As illustrated in the figures, excitation energy is first applied to the amplifier, and when the gain reaches a peak, excitation energy is applied to the oscillator to cause oscillation, thereby efficiently amplifying the oscillated laser light, and thus obtaining a laser output. FIG. 2 shows the relationship between the excitation timing of the oscillator and that of the amplifier, and the final laser output. As shown in the figure, with the temporal change of the laser gain positively utilized, the undulation of the gain is controlled by controlling the delay $\tau$ of the excitation energy application timing of the oscillator with respect to the excitation energy application timing of the amplifier. Thus, it is possible to obtain the required final laser output energy. In this case, the output energy can be controlled as desired without changing the quantity of excitation energy supplied to the oscillator or the quantity of excitation energy supplied to the amplifier.

Figure 3:
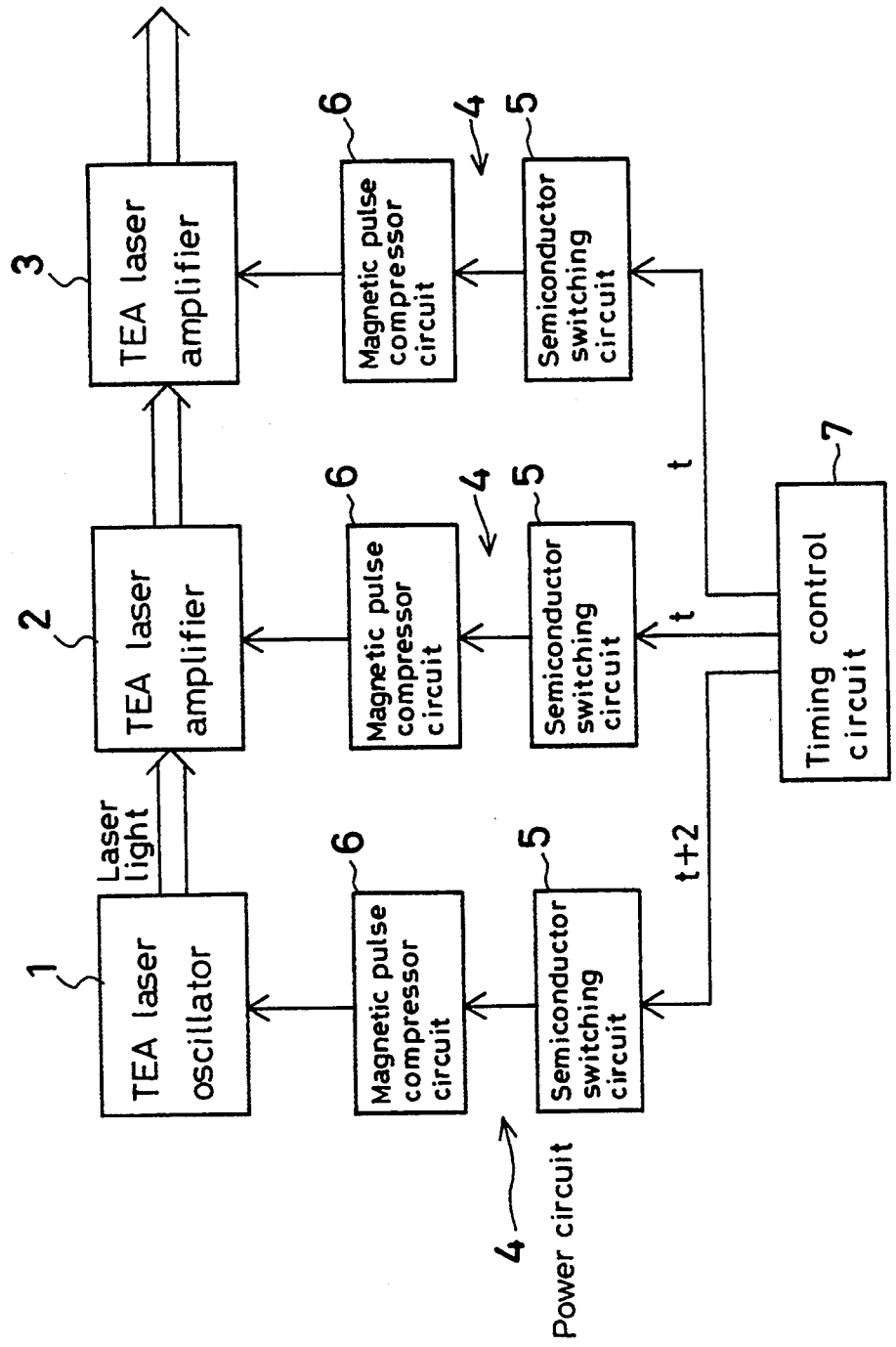
FIG. 3 is a block diagram showing the arrangement of a laser system in one embodiment for carrying out the method of the present invention.
Figure 4:
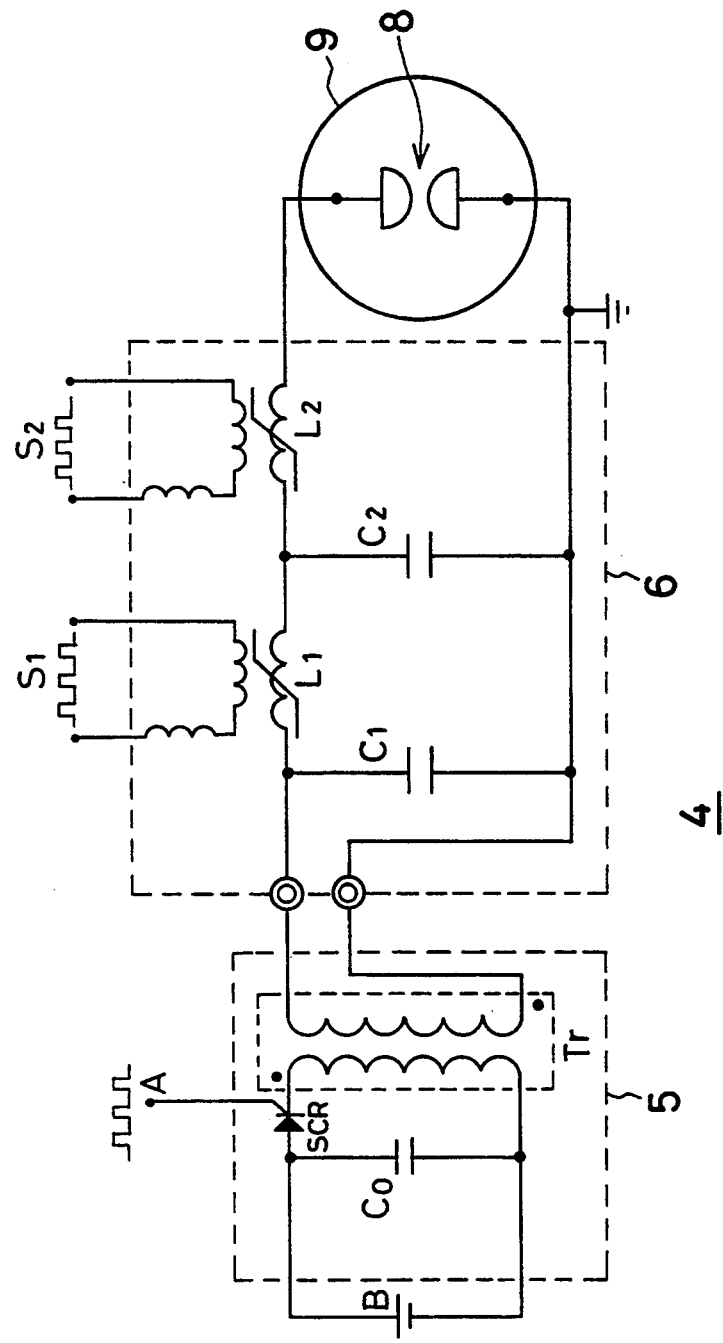
FIG. 4 is a circuit diagram showing the arrangement of a power circuit shown in FIG. 3.

The above-described principle may be applied to any kind of laser medium. However, the following is a description of one embodiment of the present invention in which it is applied to an MOPA system comprising a TEA (Transversely Excited Atmospheric-Pressure)-$CO_2$ laser that employs a switching power supply constructed exclusively of solid-state components. As shown in the block diagram of FIG. 3, the MOPA laser system has a TEA laser oscillator 1, and one or a plurality of TEA laser amplifiers 2 and 3 that amplify laser light oscillated from the TEA laser oscillator 1. The oscillator 1 and the amplifiers 2 and 3 are each associated with a power circuit 4 comprising a semiconductor switching circuit 5 and a magnetic pulse compressor 5. The pulse oscillation operation of each power circuit 4 is controlled by a timing control circuit 7. The power circuit 4 is arranged as shown in FIG. 4. The semiconductor switching circuit 5 comprises a capacitor $C_0$ for storing electric charge supplied from a DC power supply B, a thyristor SCR that passes the electric charge stored in the capacitor $C_0$ in response to a pulse signal supplied from a terminal A, and a boosting transformer $T_r$. The magnetic pulse compressor 6 comprises a capacitor $C_1$ for storing the pulse electric charge supplied from the semiconductor switching circuit 5, a saturable reactor $L_1$ that passes the input pulse when the voltage developed across the capacitor $C_1$ exceeds a predetermined level, and a reset power supply $S_1$ for resetting the saturable reactor $L_1$. The compressor circuit shown in FIG. 4 comprises two stages. The excitation pulse that is generated by the power circuit 4, arranged as described above, is applied between discharge electrodes 8 disposed in a laser tube 9 of each of the oscillator 1 and amplifiers 2 and 3.

Figure 5:
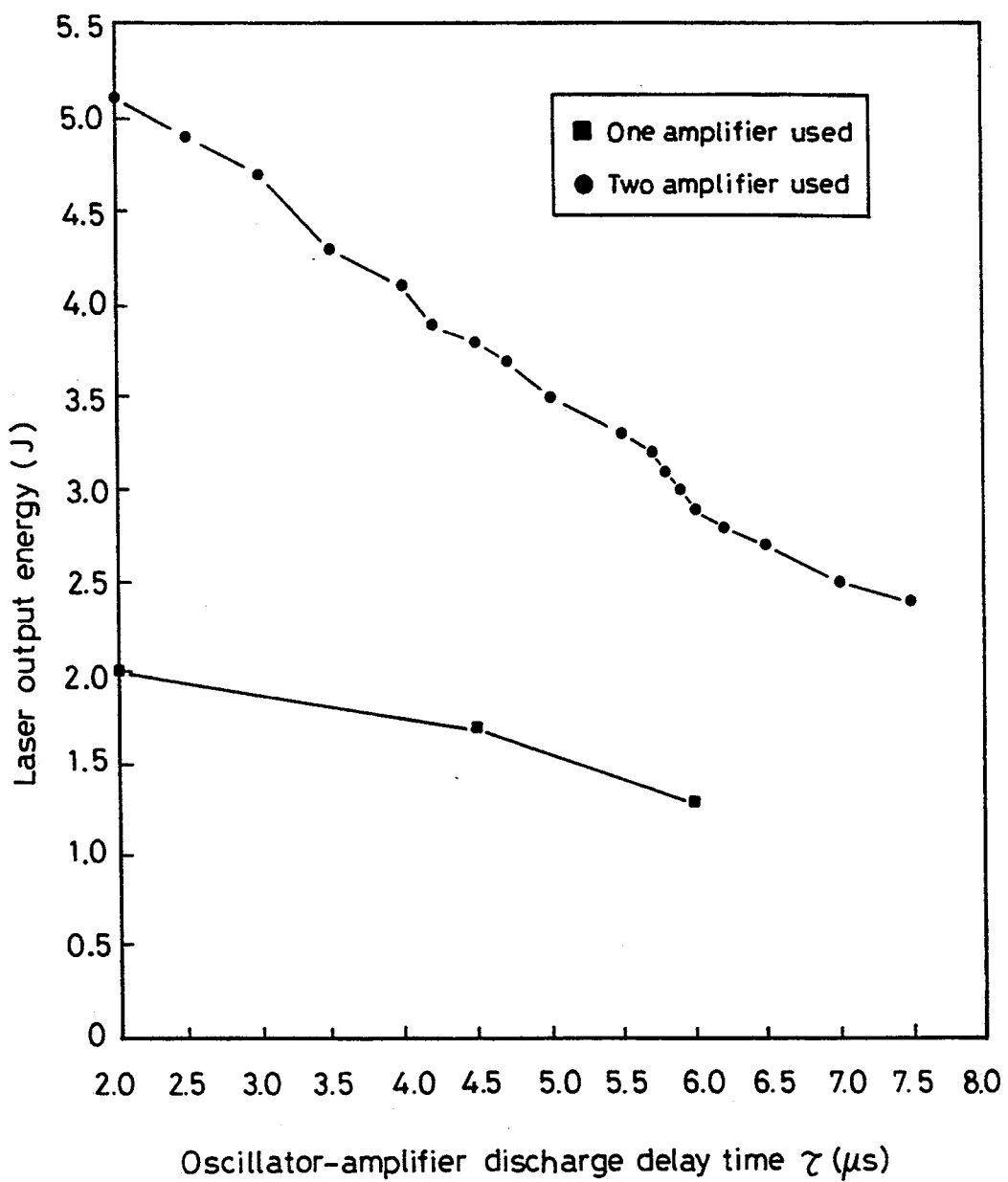
FIG. 5 is a graph showing the values of the laser output energy corresponding to changes in the discharge delay in the system shown in FIG. 3.

FIG. 5 shows exemplarily the values of the laser output energy corresponding to changes in the discharge delay (excitation energy application timing delay) of the oscillator 1 with respect to the amplifiers 2 and 3 in the above-described MOPA laser system. As will be understood from the illustrated example, the laser output energy can be varied as desired by properly setting the discharge delay of the oscillator 1 with respect to one or two amplifiers 2 and 3. When two amplifiers 2 and 3 are employed, for example, it is possible to obtain laser output energy in the range of 1 to 5 J/Pulse. It will be understood from FIG. 3 that to obtain an energy of 4.1 J/Pulse or 3.0 J/Pulse with two amplifiers 2 and 3, for example, discharge delays are set at 4.0 μs and 6.0 μs for the respective amplifiers 2 and 3. If three amplifiers are employed, the output energy can be varied in the range of 1 to 10 J/Pulse. Thus, the output energy controllable range can be enlarged by increasing the number of amplifiers employed.

Although in the foregoing the laser system output control method of the present invention has been described by way of embodiments, it should be noted that the present invention is not necessarily limited to these embodiments and that various changes and modifications may be imparted thereto. The present invention can also be applied various kinds of laser in addition to the TEA-$CO_2$ laser. The laser system that adopts the output control method of the present invention can be employed as a laser light source for various kinds of use application. For example, it is useful as laser systems for industrial use, such as a molecular laser uranium enrichment laser system, a laser machining system, etc., and laser systems for researches in physics and chemistry.

As will be clear from the foregoing description, according to the laser system output control method of the present invention, the output laser light energy is controlled by controlling the delay of the excitation energy application timing of the laser oscillator with respect to the excitation energy application timing of the laser amplifier. Accordingly, the following advantageous effects are obtained: (1) At the time of controlling the output of an MOPA laser system, the laser output can be varied without changing the excitation energy. (2) Since no change occurs in the laser medium when the laser output is varied, the thermal behavior of the medium can be maintained in the same condition at all times. Accordingly, even if the laser output is changed during continuous oscillation, the laser oscillation-amplification process can be stably carried out. (3) In a TEA-$CO_2$ laser MOPA system comprising an oscillator and an amplifier which employ a switching power supply constructed exclusively of solid-state components, the output energy can be delicately controlled in the range of 1 to 10 J/Pulse.

What we claim is:

1. An output control method for a laser system having a laser oscillator and a laser amplifier for amplifying light oscillated from said laser oscillator, wherein output laser light energy is controlled by controlling a time delay of applying excitation energy of said laser oscillator with respect to depending upon a time of applying excitation energy of said laser amplifier; and wherein excitation energy is first applied to said laser amplifier thus causing laser gain, and when, or after, said laser gain reaches a peak, excitation energy is applied to said laser oscillator to cause oscillation so as to create amplified oscillated laser light.

2. An output control method for a laser system according to claim 1, wherein the excitation energy applied to said laser amplifier and the excitation energy applied to said laser oscillator are each maintained at a constant level.

3. An output control method for a laser system according to claim 1 or 2, wherein a power supply constructed exclusively of solid-state components is employed as a switching power supply for supplying excitation energy to each of said laser oscillator and laser amplifier.

4. An output control method for a laser system according to claim 3, wherein a TEA-$CO_2$ laser is employed as each of said laser oscillator and laser amplifier.

* * * * *